No. 755,044. PATENTED MAR. 22, 1904.
M. S. RAFIELD.
BOX PULL.
APPLICATION FILED DEC. 15, 1903.
NO MODEL.
Fig. 1.
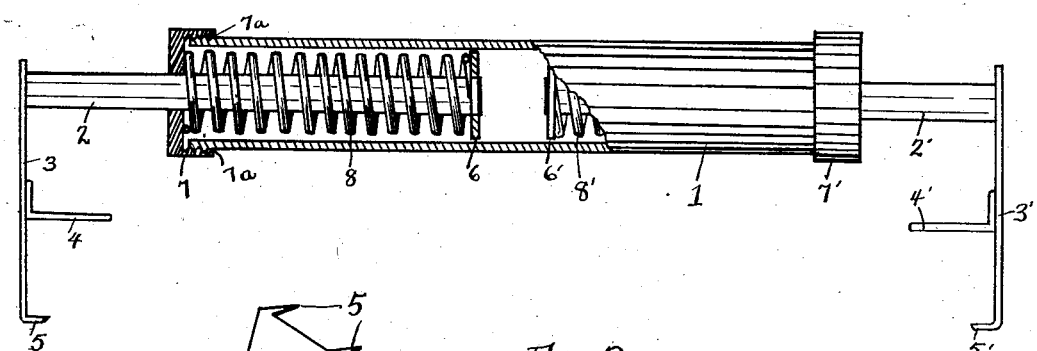
Fig 2.
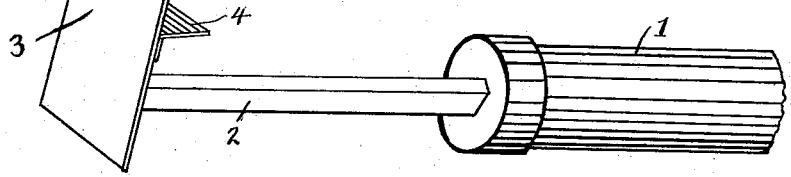
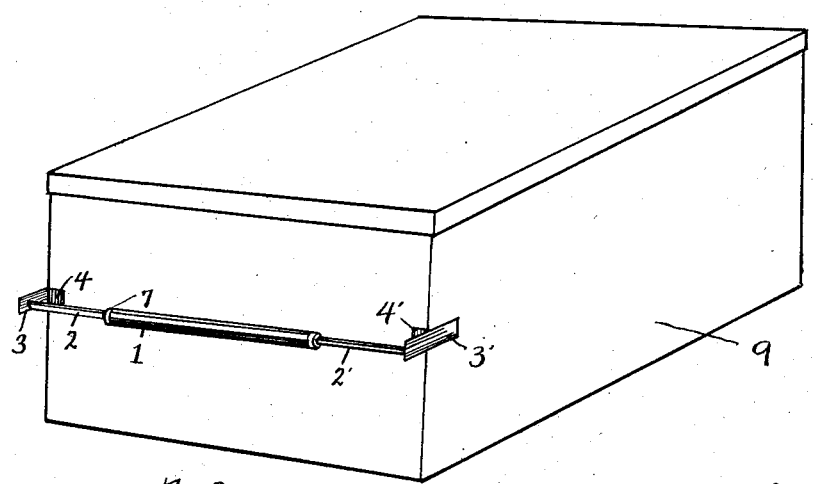
Fig 3.
WITNESSES:
F. B. Winger
A. B. Perryman
Myers S. Rafield
INVENTOR.
BY Claude L. McKesson
ATTORNEY.

No. 755,044. Patented March 22, 1904.

UNITED STATES PATENT OFFICE.

MYERS S. RAFIELD, OF COLORADO SPRINGS, COLORADO.

BOX-PULL.

SPECIFICATION forming part of Letters Patent No. 755,044, dated March 22, 1904.

Application filed December 15, 1903. Serial No. 185,237. (No model.)

*To all whom it may concern:*

Be it known that I, MYERS S. RAFIELD, a citizen of the United States, residing at Colorado Springs, in the county of El Paso, State of Colorado, have invented a new and useful Improvement in Box-Pulls, of which the following is a specification.

My invention relates to improvements in adjustable box pulls or handles, which may be either permanently or temporarily attached to pasteboard or strawboard boxes of the variety usually used in dry-goods stores. In such stores the boxes are usually stacked in tiers between and on top of the shelves. When it is desired to remove any particular box, the merchant is obliged to grasp it by the edge of the lid to pull it from its place. This soon results in the breaking of the lid and disfigurement of the box. I provide a pull or handle which obviates the difficulties, and to attain this end I utilize the mechanism herein described, and illustrated in the accompanying drawings, in which—

Figure 1 is a side horizontal view of pull with a portion of the casing removed to illustrate the interior construction. Fig. 2 illustrates the construction of one of the grips. Fig. 3 shows my device attached to an ordinary pasteboard box.

Similar characters refer to similar parts throughout the several views.

Referring to the details in the drawings, 1 is the cylindrical casing which incloses the interior springs and ends of the rods and which also serves as a handle.

2 and 2' are square rods or shafts, to the outer ends of which are attached the jaws or grips 3. 5 and 5' are teeth on the said grips, which are intended to be pressed into the sides of the box.

4 and 4' are shoulders on the grips, which serve as guides to secure a uniform depth of grip and also serve to prevent the handle being pulled downward and becoming loosened in that way. It can be readily seen that without this shoulder any force except a straight horizontal pull would cause the handle to move upward or downward and would loosen the hold of the teeth 5 and 5'.

7 and 7' are caps having on the inside screw-threads $7^a$ and are intended to be screwed onto the two ends of the casing for the purpose of holding the springs in place and furnishing a bearing for the springs. These caps have square holes cut through them to permit of the passage of the rods 2 and 2'.

6 and 6' are washers which also have square holes through them and are intended to be placed on the ends of the rods 2 and 2' after the caps 7 and 7' and the spiral springs 8 have been placed on the rods. They serve as bearings for the ends of the springs 8 and 8'.

8 and 8' are spiral metallic springs placed around the shafts 2 and 2' and serve to hold the grips in place.

The object of making the shafts 2 and 2' and the corresponding holes square is to prevent shafts from turning around and to keep the jaws always in line and ready for use.

I do not desire to be limited to the exact shape of the grip shown or to the exact manner shown of attaching the shoulder to such grip.

The method of operation is briefly described as follows: The grips 3 and 3' are pulled apart until they allow the teeth 5 and 5' to pass over the front ends of the box. The handle is then pushed inward toward the box until the shoulders 4 and 4' rest snugly against the front end of the box. The grips 3 and 3' are then depressed until the teeth take secure hold in the sides of the box 9. The action of the spiral springs will cause the handle to remain in this position until the user desires to remove it.

What I claim as new, and desire to secure by Letters Patent, is—

The combination, in a box-pull, of square shafts, a cylindrical casing inclosing spiral springs, screw-caps for said casing, with grips having on the inner sides thereof projecting shoulders, and teeth, substantially as described.

In testimony whereof I have signed my name to this specification in the presence of two subscribing witnesses.

MYERS S. RAFIELD.

Witnesses:
 CHAS. RAFIELD,
 MERLE EMERSON.